Figure 5:
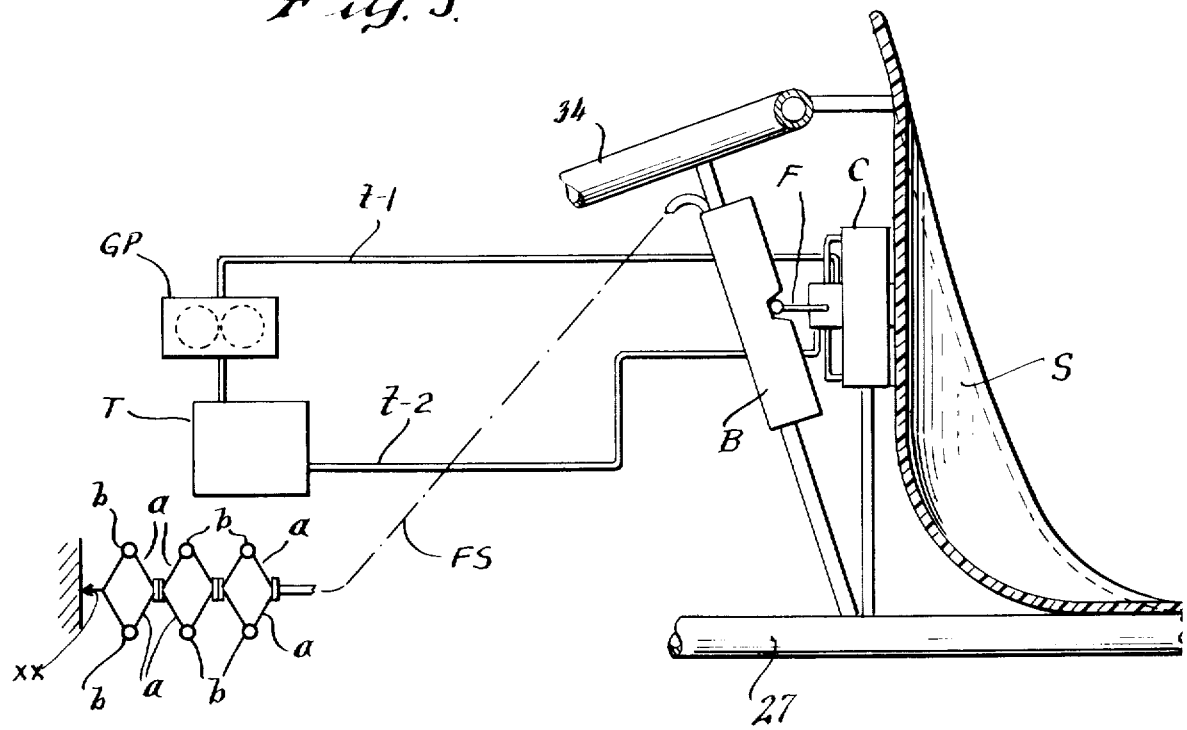

United States Patent
Rheaume et al.

[11] 3,897,842
[45] Aug. 5, 1975

[54] MOTORCYCLE FRAME CONSTRUCTION AND MEANS FOR CONTROLLING THE HEIGHT OF THE CYCLE SEAT IN ACCORDANCE WITH THE SPEED OF THE CYCLE

[76] Inventors: David F. Rheaume, Box 110, Alfred, Maine 04002; Eskil L. Karlson, 43 Westover Ln., Stamford, Conn. 06902

[22] Filed: June 25, 1973

[21] Appl. No.: 372,948

[52] U.S. Cl. .................. 180/29; 180/105 R
[51] Int. Cl. ............................ B62d 37/06
[58] Field of Search ........... 180/82 R, 29, 30, 103, 180/105 R, 110; 280/226 R; 296/65 R, 65 A

[56] References Cited
UNITED STATES PATENTS

| | | | |
|---|---|---|---|
| 1,817,848 | 8/1931 | Rogers | 180/30 |
| 3,016,967 | 1/1962 | Rehfeld | 180/30 |

*Primary Examiner*—Trygve M. Blix
*Assistant Examiner*—Jesus D. Sotelo
*Attorney, Agent, or Firm*—Buckles and Bramblett

[57] ABSTRACT

A motorcycle frame structure is adapted to support and cooperate with electrically or hydraulically controlled apparatus which sense the speed of the cycle and raise and lower the seat in response to acceleration and deceleration of the cycle, through a range of seat levels, the range preferably but not necessarily being from a level six inches below the level of the axles of the cycle wheels to substantially the level of the wheel axles.

7 Claims, 6 Drawing Figures

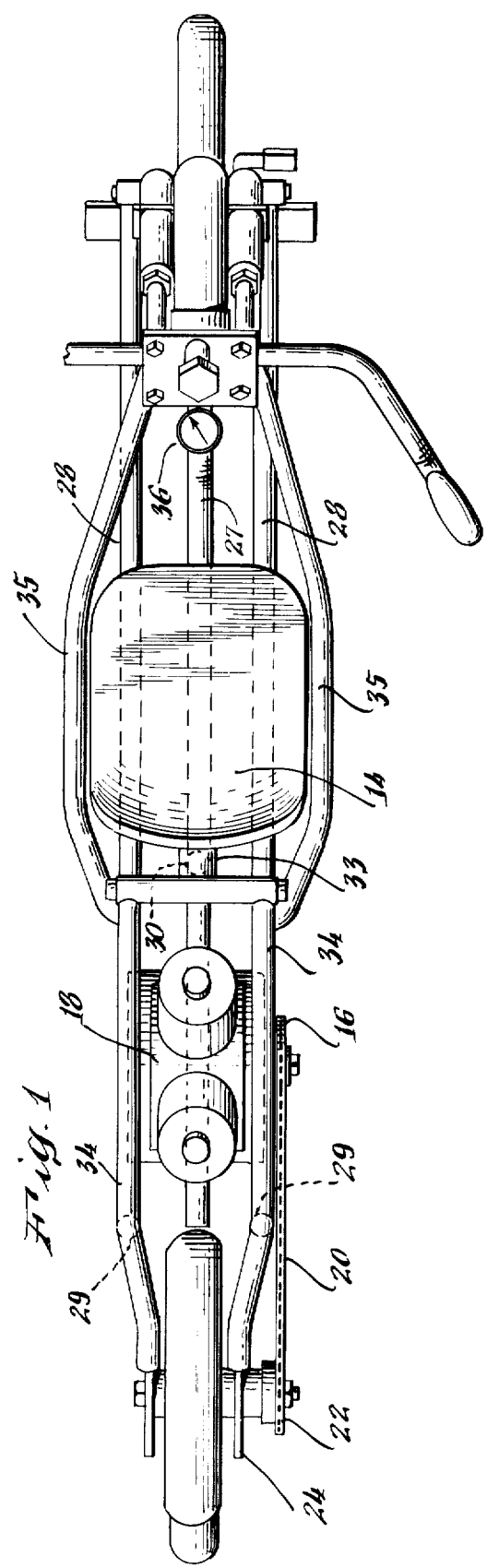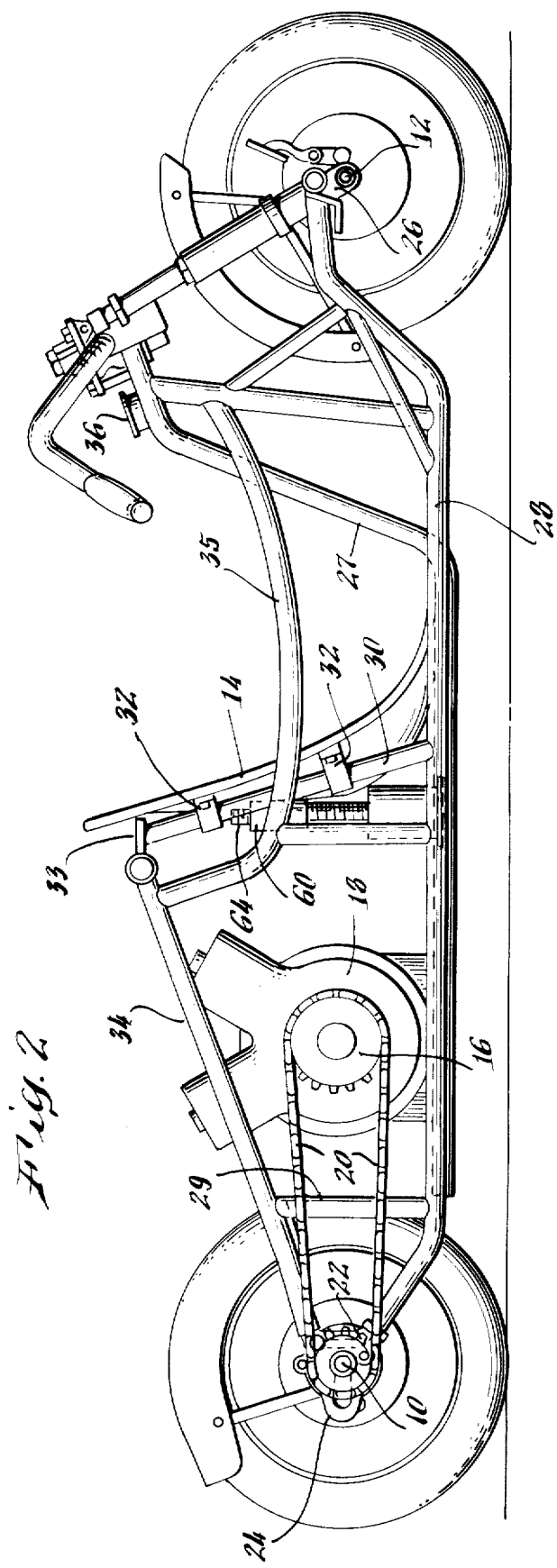

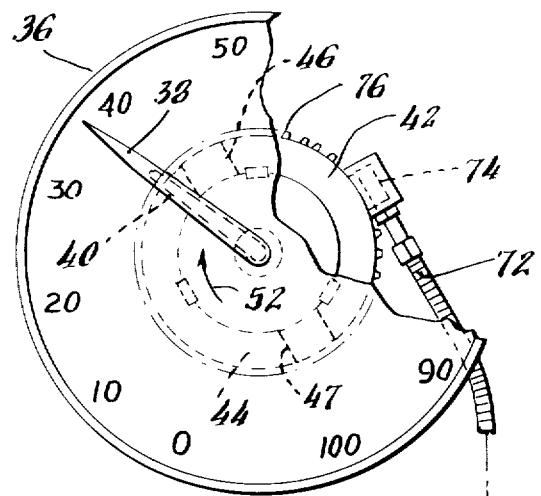
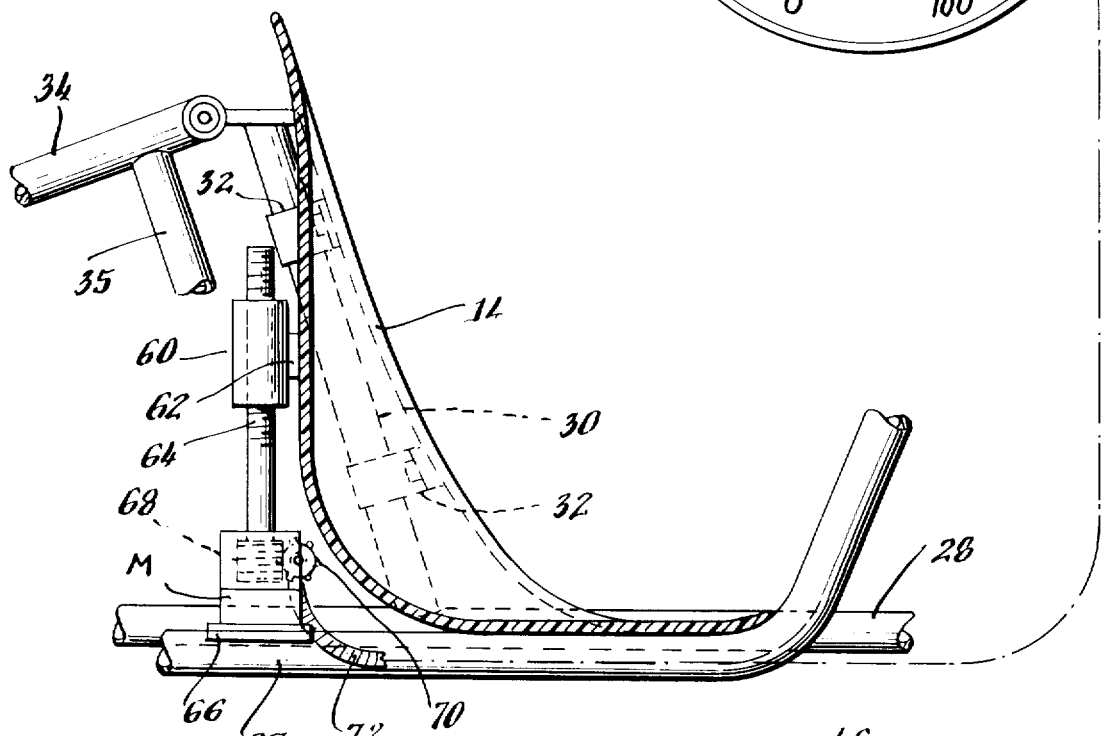
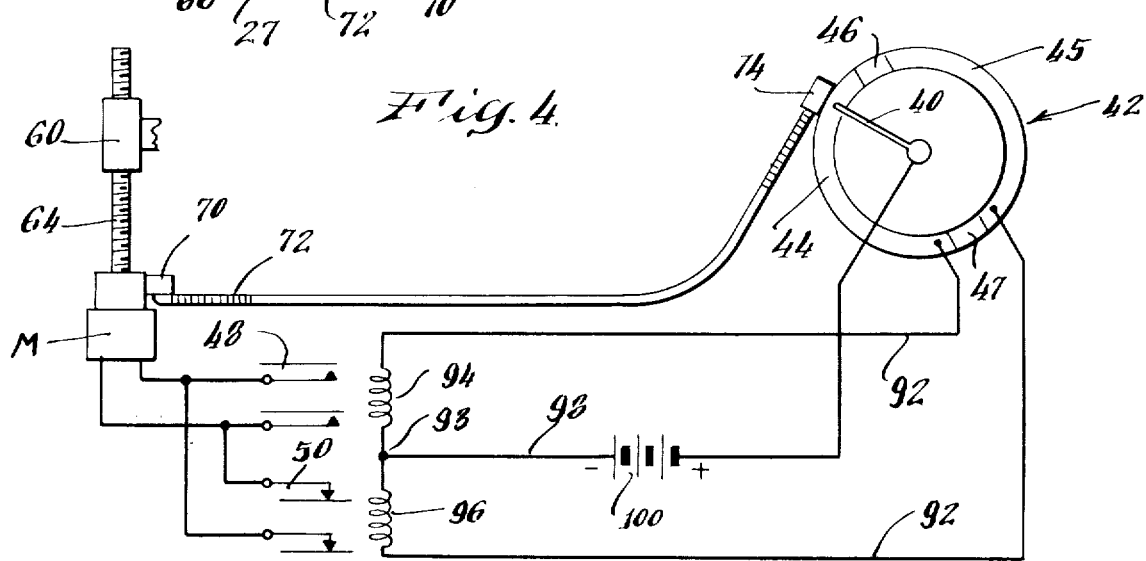

MOTORCYCLE FRAME CONSTRUCTION AND MEANS FOR CONTROLLING THE HEIGHT OF THE CYCLE SEAT IN ACCORDANCE WITH THE SPEED OF THE CYCLE

FIELD OF THE INVENTION

This invention relates to motorcycle structure and particularly to a motorcycle having a seat which is automatically raised and lowered through a predetermined range of seat heights in accordance with the speed at which the motorcycle is travelling.

Heretofore it has been conventional to make motorcycles with seats which could be adjusted in height while the cycle was not in use, as for example to accommodate the height of the seat to the length of the rider's legs, but the seat was not adjustable in height while the cycle was in motion.

Recently there has been recognition, particularly with respect to racing cycles, that an important element of safety is added when the driver's seat is positioned below the level of the top of the cycle's rear wheel and cycles have been built with seats disposed substantially at the level of the hubs of the cycle wheels and stationary at that level.

We have found that for optimum control of a motorcycle there is a range of seat heights, the particular height depending upon the speed of the cycle. For example, when starting a cycle and at speeds up to about 30 miles per hour I have found a seat level at approximately 6 inches below a line joining the hubs of motorcycles using wheels of the same size is desirable. With a seat so positioned the weight of the rider and the weight of the frame and engine is directed down on the wheels to a much greater extent than in the case of a seat disposed as in prior art cycles when the vehicles is inclined, as when turning a corner. A seat so positioned protects against sideslipping and provides optimum control directly after starting the cycle in motion and while travelling at low speed.

However, as the speed of the cycle increases the optimum position of the seat for control also rises substantially as indicated in the table below:

| Speed | Height of Seat Relative to Axles of Wheels |
| --- | --- |
| O | 6" below |
| 20 | No change |
| 40 | 5" below |
| 60 | 4" below |
| 80 | 3" below |
| 100 | 2" below |
| 120 | 1" below |

At speeds of 125 m.p.h. and higher another order of control of the cycle is attained and the optimum height for the seat is level with the wheel axles or higher. In this application we are primarily concerned with motorcycles for general use and the desired range of seat levels to be attained while the vehicle is in motion is from 6 inches below the level of the wheel axles to a position substantially level with the wheel axles.

SUMMARY OF THE DESCRIPTION

Both an electrically controlled means and an hydraulicmechanical means are described for raising and lowering a motorcycle seat through a range of movement in proportion to the speed of the cycle and irrespective of the weight of the rider sitting on the seat. Frame means provide support for the control means and prevent sidewise turning of the seat while it is being raised and lowered.

In one embodiment of seat control means a motorcycle seat is shown mounted on a vertical screw shaft by means of a nut and the shaft is rotated, and thus causes the nut and the seat to move up or down, by a motor which is controlled by a control circuit which includes a feeler contact finger which moves over a contact ring having two conductive areas separated by a non-conductive area. The feeler contact finger rests on the non-conductive area when the cycle is at rest or is travelling at an even speed. It moves onto one conductive area when the speed is accelerating thereby causing the threaded shaft to rotate in a direction to raise the seat, and it moves across the nonconductive area to the other conducting area when the cycle speed is decelerating, thereby causing the threaded shaft to rotate in a direction to lower the seat. Since the movement of the feeler contact area follows the movement of the speedometer needle, or the voltage of a generator used instead of a speedometer, the change in seat level is in proportion to the speed of the cycle within a range of speeds determined by the relative length of the conductive and non-conductive areas of the contact ring.

In another embodiment of seat control means a motorcycle is attached to a fluid cylinder which is movable up and down relative to a stationary piston head by hydraulic means (oil) which is delivered into the cylinder, above the piston head to raise the seat, or below the piston head to lower the seat, through a control valve the position of which is controlled by a linearly movable rod actuated by means such as one or more pairs of balls, which fly apart as the cycle accelerates thus causing toggle spring arms to move the rod in one direction, or move toward one another as the cycle decelerates thus causing the spring arms to move the rod in the opposite direction.

Figure 6:
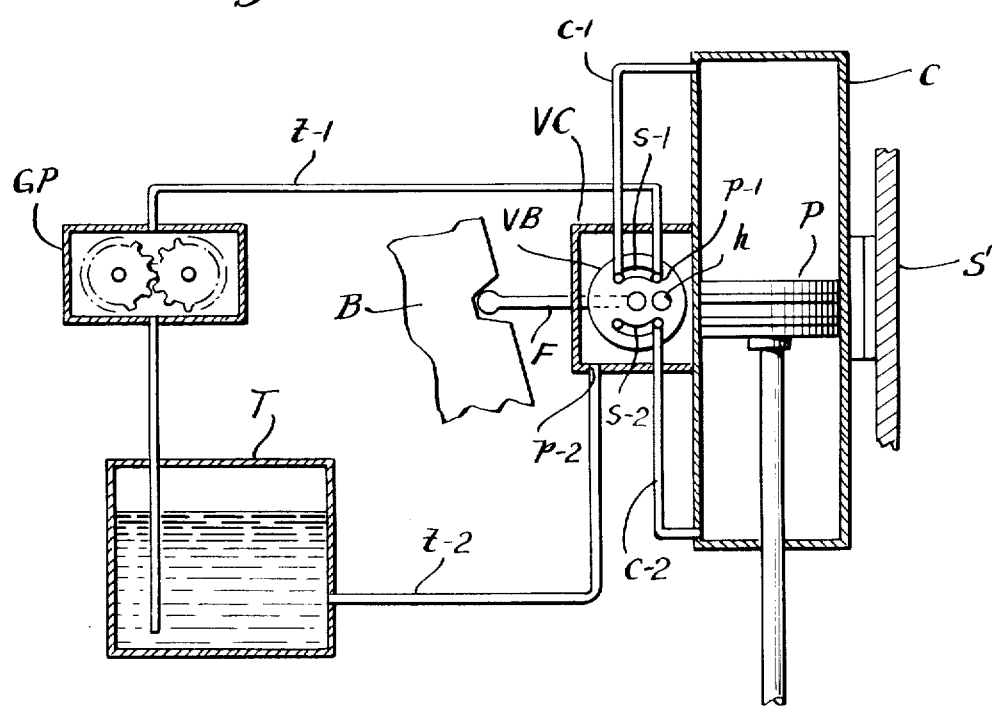

The invention will be best understood by reading the following description in connection with the drawings in which:

FIG. 1 is a top plan view of a cycle showing particularly its frame construction and disposition of control parts, FIG. 2 is a side elevation of the structure shown in FIG. 1, FIG. 3 is a side elevation of a portion of the frame showing means for raising and lowering the seat and electrical means for controlling the seat moving means in accordance with the speed of the cycle, FIG. 4 shows schematically the electrical control circuitry, FIG. 5 is a side elevation of an alternate, hydraulic-mechanical means for controlling the elevation of the seat in accordance with the speed of the cycle, and FIG. 6 is a sectional view of the fluid circuitry of the control means of FIG. 5, shown in enlarged scale.

DESCRIPTION

In FIGS. 1 and 2 a motorcycle is shown having wheels of the same size and therefor with their axles 10 and 12 in the same horizontal plane. The wheel axles are interconnected by a frame the parts of which pertinent to the invention are identified herein. The frame is shaped and disposed to support a seat 14 through a range of levels below the level of the wheel axles. The drive for the motor cycle may be conventional, from a sprocket 16 on the drive shaft of motor 18, through a chain 20, to a sprocket 22, on the axle 10 of the rear wheel.

The frame employed has means 24 and 26 at its ends for ready attachment to the axles of motorcycle wheels and so can be substituted as a unit for the frame of existing cycles. The frame is characterized by a middle longitudinal member 27 which extends downwardly from the handbars to below the seat 14 and continues rearwardly to a point just in advance of the rear wheel. The screw shaft 64 is mounted on frame member 27.

Disposed on either side of frame member 27 and extending parallel to it are the frame members 28, 28 which extend from the front wheel attachment means 26 to the rear wheel attachment means 24, on opposite sides of the wheels. The intermediate portions of members 28, 28 extend horizontally at a level well below the level of the wheel axles, preferably more than six inches below the wheel axles. From the low portions of said bars respectively seat guide rods 30 extend upwardly in parallel relation. The function of these guide rods is to engage eye brackets 32 disposed at the lateral edges of seat 14 and provide a substantially vertical slideway along which seat 14 may be raised and lowered as will be described, the guide rods acting to prevent lateral swinging of the seat irrespective of its position along the guideway.

Projecting from the back of seat 14 adjacent its top are the horizontally spaced rods 33, 33 which are pivotally connected to the forward ends of frame members 34, 34 and are long enough to permit the desired range of adjustment of the level of seat 14. These frame members are inclined rearwardly to the attachment means 24, and intermediate their ends they are connected to frame members 28, 28 by the vertical brace members 29, 29 respectively.

The laterally spaced, outwardly curving frame members 35, 35 are provided on opposite sides of seat 14, at a level above the level of frame members 27 and 28, 28.

In FIGS. 3 and 4 there is shown an electrically controlled means for raising and lowering a motorcycle seat through a predetermined range of movement, in proportion to the speed of the cycle. By way of example it may be assumed that it is desired as the cycle increases in speed over 30 mph to be able to raise the seat from six inches below the axles of the cycle wheels to a position which at 120 mph will be substantially level with the axles of the cycle wheels, and to correspondingly lower the seat while the cycle decreases in speed, and to maintain the seat at a level corresponding to an even speed.

This control system uses the speed indicator needle 38 of a speedometer 36 to move a circuit controlling conductive finger contact 40 over the surface of a rotatable contact ring 42 which may be disposed on the underside of the speedometer and has conductive areas 44, 45 separated by non-conductive areas 46, 47. Since the ring 42 is caused to rotate within a range of 180°, in accordance with up and down movement of the cycle seat 14, as will be explained, and the conductive finger contact 40 is caused to rotate in accordance with movement of the speedometer needle 38, relative movement between finger contact 40 and the ring 42 is limited but the parts are disposed so that the finger contact 40 will contact and ride on the ring 42, either on a non-conductive area of the ring, as when the motorcycle is standing still, or has not attained a minimum, speed such that it is desirable to increase the height of the seat, or while the cycle is maintaining an even speed, or on a conductive area 44, 45 of the ring on one side or the other of the non-conducting area, depending upon whether the cycle is accelerating or decelerating, but remaining in close proximity to the non-conductive area. Thus when a change occurs between accelerating and decelerating the finger contact 40 will move in one direction or the other over the non-conductive area 46 in passing between conductive areas 44 and 45 to close or open relay switches 48 or 50 controlling the direction in which the seat moving drive motor M is excited, as will be more fully described.

The seat 14 is mounted for movement vertically with nut 60 on threaded shaft 64 while being held against swinging movement by guide rods 30, 30 which extend up from the frame members 28, 28. Two vertically aligned pairs of rings 32, 32 and 32, 32 are provided on the back of the seat adjacent its lateral edges and the guide rods extend up through these pairs of rings respectively and so prevent horizon swinging of the seat both when it is stationary and when it is moving up or down.

A nut 60 is held in horizontal position and connected to the back of the seat at 62, and is mounted on the threaded shaft 64 which extends up from the motor M and is an extension of the motor shaft. Motor M is mounted behind the seat 14 on the frame member 27. Rotated by the motor shaft is a warm gear 68 which engages a gear 70 at one end of a flexible shaft 72 and rotates the flexible shaft in synchronism with the rotation of threaded shaft 64, the rotation of which causes nut 60 to move up or down, moving the seat 14 up or down. The flexible shaft 72 has at its other end a worm 75 which engages teeth 76 on the periphery of rotatable ring 42 which is mounted for rotation under the face of the cycle speedometer 80, as for example on the underside of the speedometer case.

The ring 42, which as described above comprises two electrically conductive portions 44 and 45 separated by the non-conductive portions 46 is part of an electrical actuating and control system for motor M by which the motor and its threaded shaft 64 is caused to rotate in one direction for raising seat 14, and to rotate in the opposite direction for lowering the seat. This circuit comprises the relay switches 48 and 50, mentioned above, a lead 92, the ends of which are connected to the two conductive portions 44 and 45 of ring 42, and which intermediate its ends has the coils 94 and 96 disposed in adjacent the said relay switches respectively, and a lead 98 which intermediate its ends has the power source 100, and one end of which is connected to lead 92, at 93, between the coils 94 and 96, and the other end of which is connected to the finger contact 40 which rides on the surface of ring 42, and is connected to (by means not shown), and therefore swings with, the speed indicating pointer arm or needle 38 of the speedometer 36. When finger 40 is in contact with conductive portion 44 of the ring 42 relay switch 48 closes and the motor M and shaft 64 are rotated in a direction to raise seat 14; when finger 40 is in contact with conductive portion 45 relay switch 50 closes and Motor M and shaft 64 are rotated in a direction to lower seat 14; and when finger 40 is in contact with a non-conductive area 46 (or 47) of the ring 40 both relay switches are open and the seat is stationary.

If desired, as for example if the motorcycle does not carry a speedometer, the finger contact member 40 may be rotated over the contact ring by a generator (not shown) the voltage of which increases and decreases with the speed of the cycle.

In the embodiment of the invention shown in FIGS. 5 and 6 a seat S is attached to a cylinder C which is movable up and down relative to a stationary piston head P within it, by hydraulic means, preferable oil, which is delivered into the cylinder above the piston head to raise the cylinder and seat, or is delivered into the cylinder below the piston head to lower the cylinder and seat. Hydraulic fluid for this purpose is supplied from tank T to a gear pump GP which is driven by the motorcycle motor, for example from the hub of the motor or from the drive chain which connects the motor to the hub of the driven rear wheel.

The oil or other hydraulic fluid is delivered from tank T through gear pump GP and supply conduit $t-1$ to a valve case VC, and to the appropriate end of the cylinder C, or returned to the oil tank T when the seat is not being raised or lowered, through a valve block VB therein, not shown which is rotatable within the valve case VC by the control fingers F and has in it two slots $s-1$ and $s-2$, and a hole h which goes all the way through the block VB and communicates with the interior of the valve case VC. When the valve block is rotated to a position in which inlet port $p-1$ communicates with slot $s-1$ oil will be delivered through conduit $c-1$ to the top of cylinder C and the cylinder and the seat will be raised. When the block is rotated to a position in which inlet port $p-1$ communicates with slot $s-2$ oil will be delivered through conduit $c-2$ to the bottom of cylinder C and the cylinder and the seat will be lowered. When the valve block VB is in its center position, as when the motorcycle is not travelling fast enough to reach a speed at which upward ajustment of the seat is desired, or when an even speed is being maintained, oil will flow through hole h in the valve block into the valve case VC and return from there to the oil tank through port $p-2$ in the valve case VB and the oil return conduit $t-2$.

Projecting from valve block VB through the valve case VC is a control finger F the position of which determines the rotary position of the valve block. Finger F is controlled by the position of the notched control bar B which is shown mounted for reciprocation between frame members 34 and 27. Control bar B is reciprocable through a distance equal to the range of movement desired for the seat, desirably a distance of 6 inches. Movement of control bar B is effected through a flexible shaft FS which is moved back and forth by means responsive to the speed of the motorcycle. The particular means shown are one or more pairs of balls b interconnected by pairs of toggle spring arms a that in at rest position hold the balls close together and substantially parallel. As the speed of the motorcycle increases the balls of each pair will move apart thus driving the pairs of toggle arms toward one another and thus exerting a pull on the flexible shaft FS to which the toggle arms are connected, and on the control bar B, thus moving the control bar to move control finger F in a direction to rotate the valve block VB to a position to deliver oil above the stationary piston head and thus raise cylinder C and seat S.

As the speed of the motorcycle increases, the balls, set up in pairs, speed up as they swing around in a circle, moving apart, and by the centrifugal force exert pull on the flexible shaft (FS). One end of this set of rotary balls is attached in a bearing and driven from the motorcycle's main drivetrain after the transmission so that the ball assembly can rotate but not leave the frame of the motorcycle's body at point XX. The movable end is attached to the shaft FS which moves B up or down according to the motorcycle speed. The moving element B moves F, the central arm of valve K, which in turn lets pressurized oil either in one end or the other end of cylinder C. In so doing, as the motorcycle goes faster, the centrifugal force shortens the rotating ball assembly, and pulls FS, which puts the valve in a position to send oil on to piston P, making the outside seat assembly rise with cylinder C.

The balls b are chosen so that their inertia will prevent movement of their toggle arms until the motorcycle has attained a minimum speed below which upward adjustment of the seat is not desired.

It will be understood that as the speed of the motorcycle decreases, within the range of speeds for which adjustment is desired, the balls b will move proportionately toward one another and the toggle arms a will unfold and thus exert a push on the flexible shaft FS which will move the control bar B to move control finger F and rotate the valve block to a position to deliver oil under the stationary piston head and thus force down cylinder C and seat S.

We claim:

1. A motorcycle comprising
    a pair of wheels
    a frame suspended between the wheels from the wheel axles
    a first power means
    control means for the first power means
    and means for driving one of the wheels from the first power means
    a seat,
    means for supporting the seat from the frame while permitting the seat to be raised and lowered through a range of vertical positions, a second power means, and
    means for sensing the speed of the cycle and controlling the second power means to raise and lower the seat on its support means in response to and in proportion to the acceleration and deceleration of the motorcycle.

2. The motorcycle claimed in claim 1 including co-acting means carried by the frame and the seat for preventing rotary displacement of the seat at all times including while it is being raised and lowered in accordance with the speed of the motorcycle.

3. The motorcycle claimed in claim 1 in which the frame comprises a pair of spaced vertically extending seat supporting bars and the seat is provided along its lateral edges with means for slidably engaging said bars, thus preventing rotary displacement of the seat at all times including when it is being raised and lowered.

4. The motorcycle claimed in claim 1 in which the frame on which the seat is supported extends below the axle of the driven wheel and the seat is movable in a vertical plane between positions within a range of positions including a position substantially horizontally aligned with the axle of the driven wheel and a position disposed below the axle of said wheel.

5. The motorcycle claimed in claim 1 in which the seat is movable through a range of approximately 6 inches and the means for raising and lowering the seat is effective to move the seat through said range in response to changes in the speed of the cycle between 0 to 120 m.p.h.

6. The motorcycle claimed in claim 1 in which the second power means is an electric motor and the seat is mounted by a nut on a screw shaft rotated by said electric motor, and the said electric motor is controlled by an electric circuit which includes, a source of power, a rotatable contact ring having conductive portions separated by a non-conductive portion, a conductive contact finger mounted for rotation and adapted to ride on the surface of the contact ring, and relay switch means for controlling the direction of rotation imparted to the screw shaft by the second source of power, means for swinging the contact finger back and forth in response to, and in proportion to, acceleration and deceleration of the cycle, and means actuable slightly after movement of the contact finger and responsive to the direction of rotation of the electric motor and screw shaft for rotating the contact ring, whereby the screw shaft is rotated in a direction to raise the seat when the contact finger is on one of the conductive areas of the contact ring, and is rotated in a direction to lower the seat when the contact finger is on another conductive area of the contact ring, and is stationary when the contact finger is on a non-conductive area of the contact ring.

7. The motorcycle claimed in claim 1 in which the second power means is an hydraulic cylinder movable up and down in relation to a stationary piston therein, and the seat is attached to and movable with the cylinder, delivery of hydraulic fluid above the piston head to raise the cylinder and seat or below the piston head to lower the cylinder and seat being controlled by valve means, a valve box enclosing the valve means and serving as a fluid header from which the hydraulic fluid is delivered to the respective ends of the cylinder and to which fluid is returned from the respective ends of the cylinder, a storage tank containing a supply of hydraulic fluid, conduit means leading from the storage tank to the valve box, conduit means leading from the valve box back to the storage tank, pump means disposed in the conduit leading from the storage tank to the valve means, means, which may be the first power means, for driving the pump, a trigger arm controlling the valve means within the valve box and projecting outwardly from the valve box, a bar coactive with the projecting arm for controlling the position of the valve means to deliver hydraulic fluid to one end or the other end of the cylinder or directly back to the storage tank, the control bar being reciprocable through a distance equal to the range of movement desired for the seat, and means responsive to the speed of the cycle for controlling the position of the control bar.

* * * * *